United States Patent
Brubaker et al.

(10) Patent No.: US 8,571,744 B2
(45) Date of Patent: Oct. 29, 2013

(54) GUIDANCE METHOD FOR AGRICULTURAL VEHICLE

(75) Inventors: Christopher A. Brubaker, Leola, PA (US); Phillip A. Cobb, Plain City, OH (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/529,891

(22) Filed: Jun. 21, 2012

(65) Prior Publication Data

US 2012/0265392 A1    Oct. 18, 2012

(51) Int. Cl.
*G01C 22/00*    (2006.01)

(52) U.S. Cl.
USPC ........... 701/25; 701/26; 701/27; 701/40; 701/42; 701/46; 701/47; 701/50; 701/408; 701/411; 56/10.1; 56/13.3; 56/341; 56/344; 100/4; 100/45; 100/49; 100/76; 100/88

(58) Field of Classification Search
USPC .......... 701/25, 26, 27, 40, 42, 44, 50, 43, 47, 701/408, 411, 416; 56/341, 13.3, 344, 10.1
See application file for complete search history.

(56) References Cited

U.S. PATENT DOCUMENTS

| | | | |
|---|---|---|---|
| 4,065,914 A | 1/1978 | Phillips et al. | |
| 4,224,867 A | 9/1980 | Gaeddert et al. | |
| 4,295,323 A | 10/1981 | Maier et al. | |
| 4,433,533 A | 2/1984 | Giani | |
| 4,702,066 A * | 10/1987 | Newendorp et al. | 56/341 |
| 4,748,801 A | 6/1988 | Sheehan et al. | |
| 4,924,405 A | 5/1990 | Strosser et al. | |
| 5,131,214 A | 7/1992 | Vermeer | |
| 5,152,123 A | 10/1992 | Viaud et al. | |
| 5,226,359 A | 7/1993 | Rempe | |
| 5,551,218 A | 9/1996 | Henderson et al. | |
| 5,615,544 A * | 4/1997 | Berger et al. | 56/341 |
| H1819 H | 12/1999 | Anderson et al. | |
| 6,539,303 B2 | 3/2003 | McClure et al. | |
| 6,675,561 B2 | 1/2004 | Davis et al. | |
| 6,874,412 B1 | 4/2005 | Glaszcz et al. | |
| 7,142,956 B2 | 11/2006 | Heiniger et al. | |
| 7,216,033 B2 | 5/2007 | Flann et al. | |
| 7,222,566 B2 | 5/2007 | Biziorek | |
| 7,331,279 B2 | 2/2008 | Biziorek et al. | |
| 7,363,154 B2 | 4/2008 | Lindores | |
| 7,404,355 B2 | 7/2008 | Viaud et al. | |
| 7,451,030 B2 | 11/2008 | Eglington et al. | |
| 7,913,482 B2 * | 3/2011 | Olander et al. | 56/341 |
| 7,918,158 B2 * | 4/2011 | Viaud | 100/45 |
| 2004/0199303 A1 * | 10/2004 | Ohmura et al. | 701/5 |
| 2007/0175198 A1 * | 8/2007 | Viaud et al. | 56/341 |
| 2008/0087177 A1 | 4/2008 | Olander et al. | |
| 2008/0289308 A1 | 11/2008 | Brubaker | |

* cited by examiner

*Primary Examiner* — Redhwan K Mawari
(74) *Attorney, Agent, or Firm* — Patrick M. Sheldrake

(57) ABSTRACT

An automated method and system includes an automatic guidance system (AGS) and swath pattern. The AGS steers a vehicle towing a rotary baler in an "S", or oscillatory pattern around a predetermined approximate centerline of the swath path. The oscillatory pattern may be user defined. By steering the vehicle in an oscillatory pattern referenced to the A-B line, a windrow of crop material may be distributed into an even and optimal bale size and density by the baler. Bale chamber sensors detect an imbalance of crop density and in response, AGS adjusts an interval or amplitude of oscillatory pattern.

4 Claims, 5 Drawing Sheets

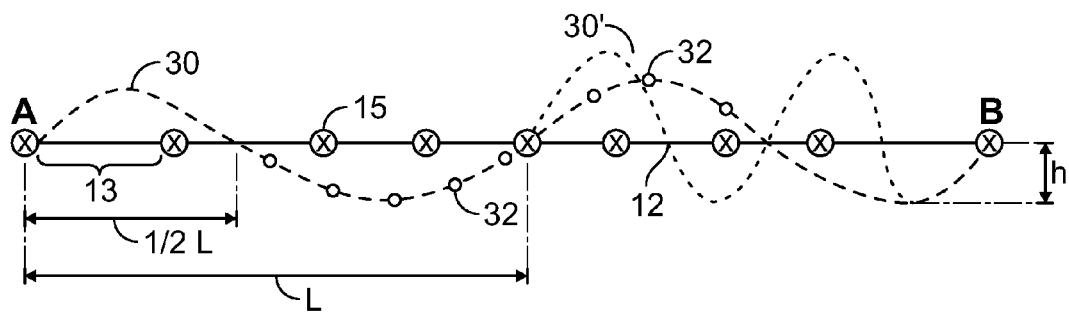
FIG. 2
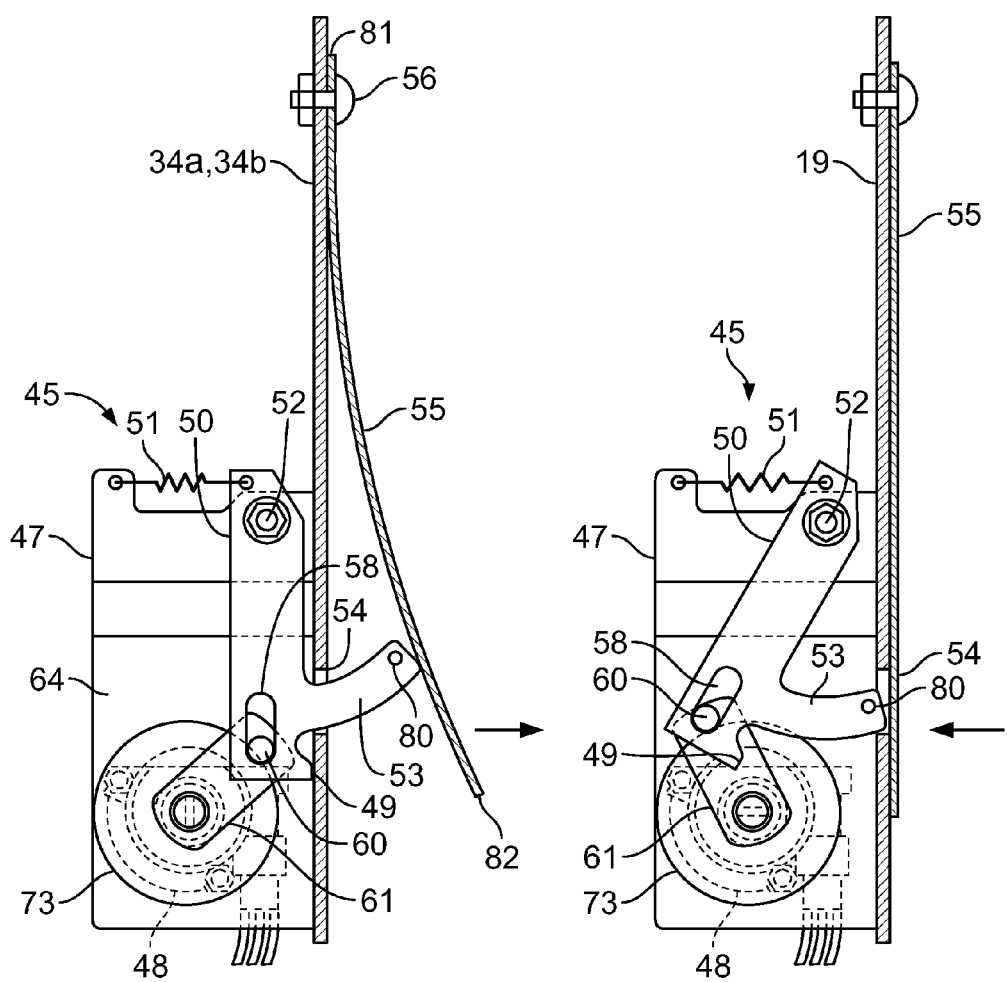
FIG. 3
FIG. 4

GUIDANCE METHOD FOR AGRICULTURAL VEHICLE

This divisional application claims priority under 35 U.S.C. §120 from co-pending U.S. patent application Ser. No. 12/483,400 filed on Jun. 12, 2009, with the same title. The full disclosure of U.S. patent application Ser. No. 12/483,400 is hereby incorporated by reference.

FIELD OF THE INVENTION

The present invention is directed to a method and system for guidance of an agricultural vehicle, and more specifically, to a method and system for automatically guiding a tractor and attached baler implement to provide even distribution and density of material in a round bale.

BACKGROUND OF THE INVENTION

Automatic steering systems for agricultural vehicles may include a guidance module with a Global Positioning System (GPS) receiver and a microprocessor adapted to process and store GPS data defining travel paths, or swath paths. The swath paths can be associated with a cultivated field in an agricultural vehicle application. An automatic steering module is connected to the guidance module to steer the vehicle, e.g., via a primary hydrostatic steering system.

Accurate vehicle and specialized farming equipment guidance is used in agricultural applications, for example, tilling, planting, spraying, fertilizing, harvesting and other farming operations. Such implements may be operated and applied by repeatedly traversing cultivated fields. Ideally, the equipment is guided through accurately-spaced passes or swaths, the spacing of which is determined by the swath width of the equipment. Gaps and overlaps in the swath paths may occur when operators deviate from the ideal guide paths, resulting in under-coverage and over-coverage respectively. Such gaps and overlaps may be a concern for certain agricultural operations, for example, by reducing crop yields. Previous systems for assisting with the guidance of agricultural equipment include foam markers, which deposit foam along the swath edges.

Currently automatic guidance systems on agricultural vehicles are pre-programmed with standardized guidance patterns, e.g., straight, curved, circular and spiral. Those existing standardized guidance patterns are inadequate to accommodate a swath path of a tractor and baler implement for harvesting narrow windrows. While harvesting windrows with a baler implement, operators must slowly maneuver the tractor back and forth in a windrow to maintain an even distribution of material in the chambers of the baler implement. Sensors for detecting the shape of a bale have been developed to give steering information to the operator, but the operator relies upon a manual steering operation to form evenly distributed material density and shapes of bales. By maintaining an even distribution of material in the baler implement, the resulting bales produced by the baler implement are of optimal size and density. GPS automatic guidance systems alone are not capable of maneuvering the tractor in a back and forth pattern along a windrow.

Therefore there is a need for an automatically guided agricultural vehicle that can produce bales of evenly distributed material and density, and having a desired shape.

SUMMARY OF THE INVENTION

In one embodiment, a method is disclosed for automatically guiding a powered vehicle towing an agricultural implement for producing an even distribution of crop material in a bale. The method includes the steps of generating and storing a map of information representative of a location of a first path in a field; receiving a location information representative of a position of the powered vehicle in the field; retrieving map data defining the first path; determining a second path that oscillates about the first path; generating a steering command based on at least one of the location information, the first path, or the second path; and executing the steering command by a steering system of the powered vehicle to steer the powered vehicle along a path that corresponds to the second path. Other features and advantages of the present invention will be apparent from the following more detailed description of the preferred embodiment, taken in conjunction with the accompanying drawings which illustrate, by way of example, the principles of the invention.

In another embodiment, a method is disclosed for automatically guiding a powered vehicle towing an agricultural implement for producing an even distribution of crop material in a bale. The method includes the steps of generating and storing a map of information representative of a location of a first path in a field; receiving a location information representative of a position of the powered vehicle in the field; retrieving map data defining the first path; determining a second path that oscillates about the first path; generating a steering command based on at least one of the location information, the first path, or the second path; executing the steering command by a steering system of the powered vehicle to steer the powered vehicle along a path that corresponds to the second path; monitoring a bale shape information by the auto guidance system from a plurality of bale sensors disposed in the agricultural implement, each of the bale sensors configured to generate an indicating signal representing the distribution of crop material in a bale chamber of the agricultural implement; and adjusting the second path in response to a plurality of the indicating signals indicating an imbalance of crop material in the bale chamber.

In yet another embodiment, a system is disclosed for automatically guiding a powered vehicle towing an agricultural implement for producing an even distribution of a crop material in a bale. The system includes a powered vehicle, a rotary baler, a global positioning system and an automatic guidance system. The powered vehicle includes a global positioning system (GPS) sensor and an automatic guidance system. The GPS sensor is configured to receive information representative of a geographic location of the powered vehicle. The automatic guidance system includes a map stored in a data memory. The automatic guidance system is arranged to receive a location information representative of a position of the powered vehicle in the field; retrieve map data defining the first path; determine a second path that oscillates about the first path; generate a steering command based on at least one of the location information, the first path, or the second path; and execute the steering command by a steering system of the powered vehicle to steer the powered vehicle along a path that corresponds to the second path.

BRIEF DESCRIPTION OF THE DRAWINGS

FIG. 2 shows an exemplary A-B line and an associated oscillatory path.

FIG. 3 shows an exemplary bale shape sensor in an extended position.

FIG. 4 shows a bale shape sensor of FIG. 3 in a retracted position.

DETAILED DESCRIPTION OF THE INVENTION

In one aspect an automated method and system, described in detail below, includes an automatic guidance system (AGS) and swath pattern. The AGS steers a tractor in an "S", or oscillatory pattern around a predetermined approximate centerline of a swath path, is commonly referred to as an A-B line by those skilled in the art. In one embodiment the oscillatory pattern may be user defined. By steering the tractor in an oscillatory pattern referenced to the A-B line, a windrow of material, for example hay or canola, may be distributed into an even and optimal bale size and density by a baler.

In another aspect described below, the automated method and system may include modifying the characteristics of the oscillation pattern in response to bale chamber sensors that signal an imbalance or uneven distribution of baled material in adjacent chambers of the baler. The bale chamber sensors detect the amount of material present in, for example, the right baler chamber and the left baler chamber in a two-chamber baler arrangement. Information provided by the chamber sensors may be used to automatically modify the oscillatory pattern of the tractor guidance system in a manner that equalizes, or substantially equalizes, the amount of material in each of the baler chambers. Two or more baler chambers may be provided in the baler, preferably each baler chamber including a material sensor.

Figure 1:
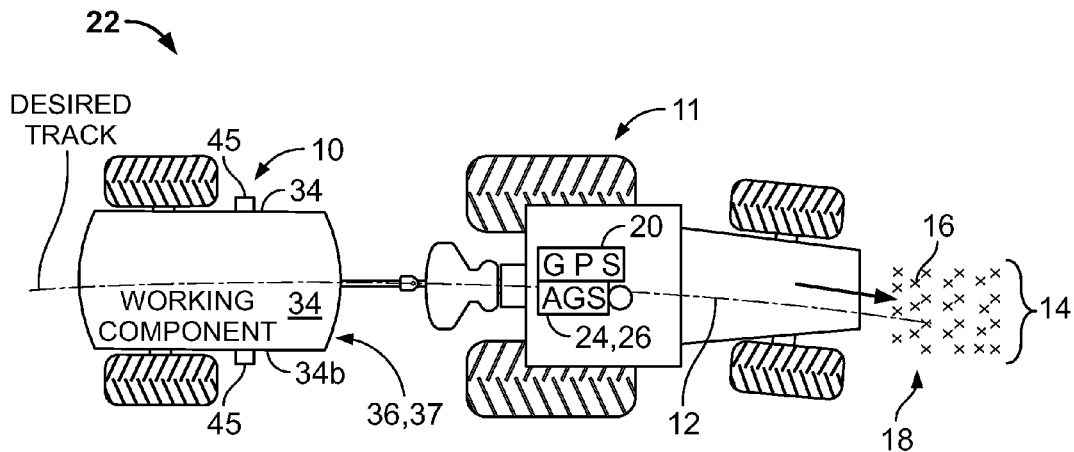
FIG. 1 shows a schematic plan view of an exemplary agricultural vehicle with a baler attached.

Referring to FIG. 1, a rotary baler 10 is towed by a powered vehicle 11 (e.g., a tractor) along a centerline 12 of a swath path 14 in which crop material 16 has been arranged into a pile, or a windrow 18. Baler 10 has a bale forming chamber 34 that includes a pickup 36 with tines 37 configured to lift crop material from the ground and deliver it rearward to baler chamber 34. A detailed description of an exemplary baler 10 is set forth in U.S. Pat. No. 5,615,544, incorporated by reference herein.

Powered vehicle 11 is equipped with a global positioning system (GPS) sensor 20 and an automatic guidance system 24. GPS sensor 20 receives location information from GPS which is representative of vehicle 11 position in a field. Vehicle 11 is guided according to a map 26 that is stored in automatic guidance system 24, typically created while windrow 18 was formed. Map 26 may include information representative of the location of windrow 18 in a field 22. For example, a centerline or A-B line 12 of windrow 18 may be approximately defined by a series of line segments 13 defined by points 15 (FIG. 2) to form the centerline 12. Map 26 may include information from GPS sensor 20 which is representative of baler 10 location. Because it is not uncommon for windrows 18 of crop material 16 to be narrower than the width of the bale forming chamber 34, it is necessary for the operator or automatic guidance system 24 to steer baler 10 along a path that results in substantially uniform transverse distribution of hay to avoid poorly shaped bales. Previously, this approach relied on the experience and technique of the operator to determine when to shift the position of the baler relative to the windrow.

Referring next to FIG. 2, in a first embodiment an automatic guidance system 24 for a baler 10 is implemented in an open loop configuration. Automatic guidance system 24 references data provided by map 26 to determine an oscillatory path 30 along A-B line 12. Oscillatory path 30 is predetermined based on A-B line 12. Recognizing that powered vehicle 11 and baler 10 will generally provide an unevenly distributed or shaped bale by simply following A-B line 12, automatic guidance system 24 generates a set of data points 32 with reference to A-B line 12. Data points 32 connect to form oscillatory path 30. Automatic guidance system 24 steers powered vehicle 11 from one data point 32 to the next adjacent data point 32, such that powered vehicle 11 crosses A-B line 12 in a periodic pattern that is generally symmetrical about A-B line 12. Automatic guidance system 24 may apply an algorithm that takes into account the difference in the width of windrow 18 and baler 10 to calculate a characteristic frequency, or interval L versus time, and amplitude h, to steer powered vehicle 11 and baler 10 along a generally sinusoidal oscillatory path 30 with reference to A-B line 12, thus ensuring that crop material 16 is distributed evenly to bale forming chamber 34.

Automated steering systems are known in the art, for example, hydraulically actuated or electronically actuated steering wheels that adjust the direction of the wheels. While FIG. 2 illustrated A-B line 12 as a straight line, it should be understood that A-B line 12 may have an irregular or non-uniform contour, as the contour of A-B line 12 may be dependent upon variations in elevation in field 22. Field may include hills and valleys and other naturally occurring contours, resulting in a line that is not straight. Even in a level field 22, A-B line 12 may deviate from a straight line due to irregular boundary lines that may prevent or inhibit straight line trajectories. Thus, oscillatory path 30 may not appear to be sinusoidal due to undulations or perturbances in the profile of A-B line 12. In one embodiment, baler chamber 34 may cover a width extending from a first side 34a to an opposite, second side 34b, and amplitude h is equal to one-half of the width of chamber 34, so that each side 34a, 34b, traverses windrow 18 equally in one interval L. Different algorithms may also be applied, which, e.g., account for angle of repose.

A bale sensor assembly 45 is mounted on either side wall 34a, 34b, shown in FIG. 1. Although only two sensor assemblies are shown and described, it should be understood that the disclosed method contemplates the use of multiple, e.g., left and right sensors, and in some embodiments, more than two sensors, e.g., a middle section sensor or sensors. In the two-sensor configuration, each sensor may be separately mounted on the inside of an associated opposing side wall of baler 10. A paired arrangement of this nature is disclosed in U.S. Pat. No. 5,444,969, referred to above, which is hereby incorporated by reference.

FIGS. 3 & 4 show a sensor assembly 45 mounted on side wall 34a or 34b, as shown in FIG. 1. Another sensor assembly is similarly mounted on the opposing side wall 34b of baler 10, in a paired arrangement as mentioned above. For the purposes of this description, only assembly 45 will be described in detail but it is intended that like comments would apply to its counterpart assembly mounted on opposing side wall 34b.

A mounting bracket 47 affixed to the outside of side wall 34a, 34b has mounted thereon a potentiometer 48 and a pivotally mounted sensor plate 50. A spring 51 engages plate 50 to urge it in a counter-clockwise direction about a bolt 52, at which bolt plate 50 is pivotally mounted to bracket 47. Spring 51 under tension holds plate 50 against the outside surface of wall 34a, 34b, at shoulder 49 in the empty chamber condition shown in FIG. 3. An integral finger portion 53 of plate 50 extends through wall 34a, 34b via oval shaped aperture 54. Finger 53 is urged toward a leaf spring 55 secured to the inside of side wall 34a, 34b by conventional fasteners such as bolts, nuts, screws, and other similar devices. Leaf spring 55 is preset in the position and shape shown in FIG. 3 under no load conditions. Spring 51 in such no load position provides force sufficient to maintain shoulder 49 in contact with wall 34a, 34b. Thus under conditions where there is no crop material in the vicinity of the sensor in the chamber, the end of finger portion 53 is in contact with leaf spring 55 but applies no force or a negligible force against leaf spring 55.

A slot 58 in plate 50 accommodates an actuator rod 60 extending from a rocker arm 61. When plate 50 pivots about bolt 52, rod 60 traverses slot 58 and thereby moves rocker arm 61 between the position shown in FIG. 3 and the position shown in FIG. 4, in which the position of the elements of sensor assembly 45 is shown under conditions where maximum crop compaction in the vicinity of sensor assembly 45 is sensed.

Potentiometer 48 may be any commercially available potentiometer. An exemplary potentiometer 48 is manufactured by CTS Corporation, of Elkhart, Ind. Potentiometer 48 may be a sealed unit which enhances system integrity in the dust and debris laden environment under which rotary baler 10 typically operates. Potentiometer 48 is rotatable against a spring in a conventional manner. Potentiometer 48 is urged in a clockwise direction and thereby acts with spring 51 to urge rocker arm 61 in a counter-clockwise direction. The position of the potentiometer 48 is precisely maintained relative to rocker arm 61 and accordingly, leaf spring 55.

Figure 6:
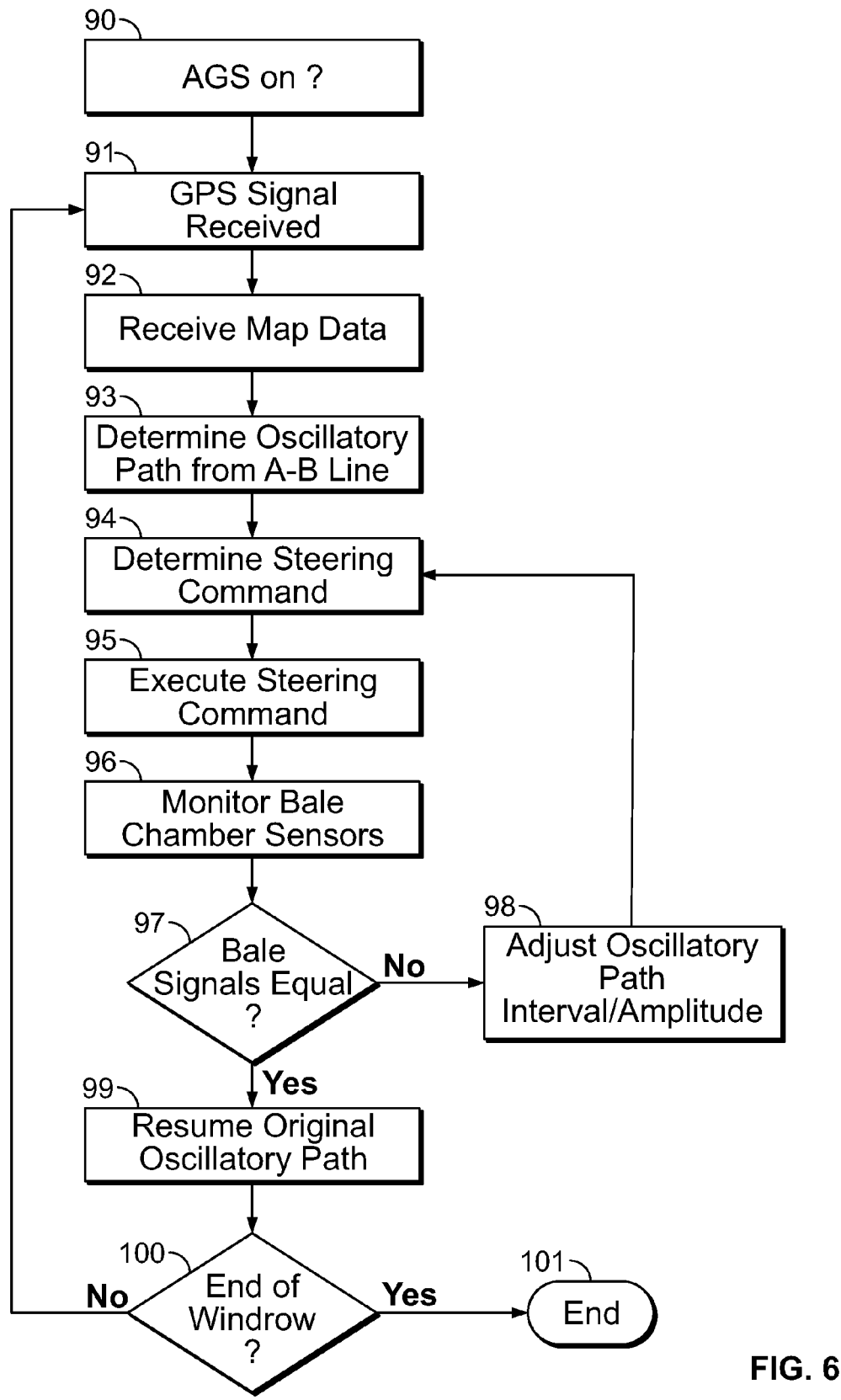
FIG. 6 shows a flow diagram for one embodiment of the signal processing network.

An exemplary electrical system diagram of FIG. 6 comprises a signal input section to the left of line 81, a controller section, between lines 81 and 82, and an automatic guidance system 24 to the right of line 82. The sensors of the input section are mounted on the baler as discussed above, as is the controller, while automatic guidance system 24 is remotely located, e.g., in the control area of the tractor to which the round baler is coupled.

More specifically, potentiometers 48 and 48' introduce continuous analog signals into an analog-to-digital converter circuit 83, which produces digital values or signals representative of the analog inputs in a conventional manner. These digital values or signals are processed in a microprocessor 84 which is programmed to evaluate the incoming values, based on signals sensed by the potentiometers, and yield digital data corresponding to averaged levels of comparative degrees of compaction. This data is transferred via a serial link 85 interconnecting the controller and automatic guidance system 24 in data communication with a second microprocessor 86 programmed for decoding the digital data and producing signals in a conventional manner for input to automatic guidance system 24, and, optionally, for display in display unit 78.

The data that is derived from signals at potentiometers 48 and 48' is processed on the round baler in the controller which permits it to be passed to automatic guidance system 24, via serial link 85, with attendant advantages of such data transfer in an adverse environment, which include the presence of various magnetic and electrical components that generate unwanted transient noise that could lead to adverse effects on analog data. Another advantage of the serial link system is the ability for the round baler and incorporated controller to be readily disconnected and recoupled to any tractor equipped with a compatible operator panel.

Figure 1A:
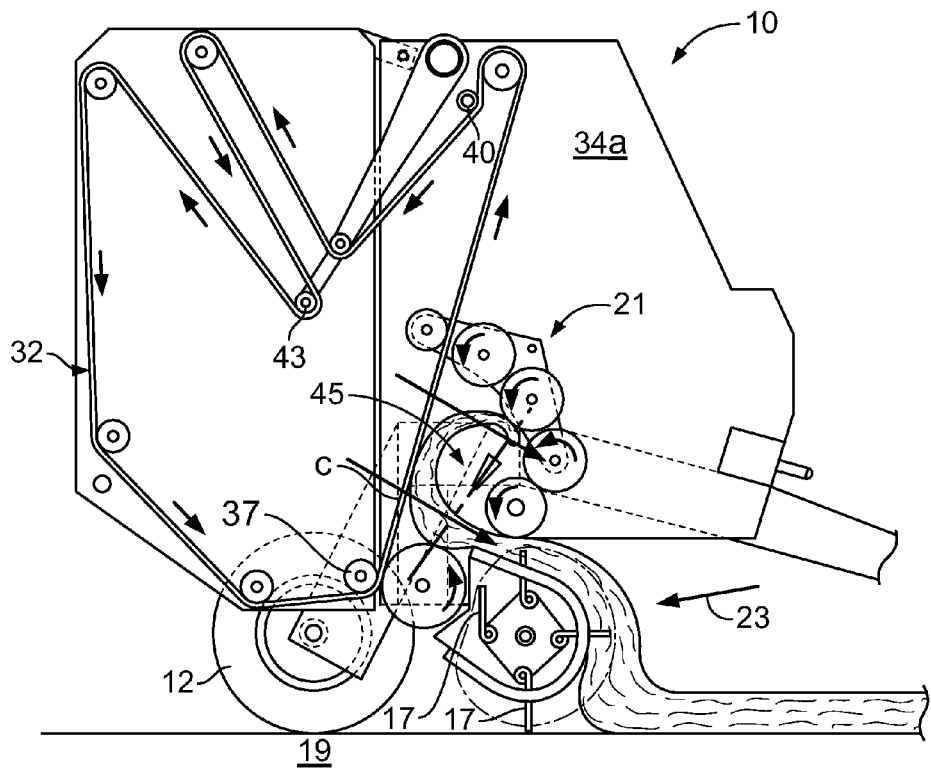
FIG. 1A shows a cross-sectional view of the baler.

Referring next to FIG. 1A in operation, as mentioned above, crop material is picked up by pickup 23 and conveyed by tines to floor roll 19 which urges it against upwardly traveling course c of apron 33. Initially, when the bale forming chamber is empty material begins to spiral in a clockwise direction until it engages the rollers of sledge assembly 21 which continue to coil it in a spiral fashion causing course c to expand until it reaches the full bale position. During such bale forming operation, crop material adjacent the side walls in the peripheral portion of the cylindrical package being formed is in continuous contact with leaf spring 55 of opposing similar sensor assemblies 45 (FIGS. 3 and 4). More specifically, crop material traverses the leaf springs in a longitudinal fashion along a generally spiral path from the upstream end 79 to the downstream end 82. In this manner the degree of crop compaction is sensed as the preset bias is overcome and the leaf springs are urged toward the side walls. The position of potentiometer 48, 48' will vary based on the position of its associated leaf spring, which moves toward or away from the side wall in response to the force exerted by crop material passing thereover. This force is directly proportional to the degree of compactness of the crop material. The leaf springs in turn move the associated control arms of the potentiometers, thereby varying the voltage potential in direct relationship to the compactness of the crop material which is indicated by display unit 78 in the manner described above.

Thus, as the cylindrical package of crop material increases in size, the comparative degree of compactness of its ends is monitored, enabling the automatic guidance system 24 to modify the relative quantity of crop material being fed to the transverse regions of the bale forming chamber in response to left and right potentiometer 45 output voltages. For example, when a predetermined differential of levels is exceeded and the left end is low, the automatic guidance system 24 detects an imbalance in the voltage output of potentiometers. In this instance, the automatic guidance system 24 will steer the baler to fill the left side or adjust the length of internal L, i.e., frequency of the oscillatory path 30 until the left and right levels of compaction reach an acceptable relationship. In the event the comparative degree of compaction displayed in the readout reaches an unacceptable relationship due to low compaction on the right end of the cylindrical package of crop material being formed in the chamber as compared to the left end, the automatic guidance system 24 reacts by steering vehicle 11 to fill the right side with crop material 16 until the potentiometer 48 output voltages become balanced or attain an acceptable proportionate relationship.

Figure 5:
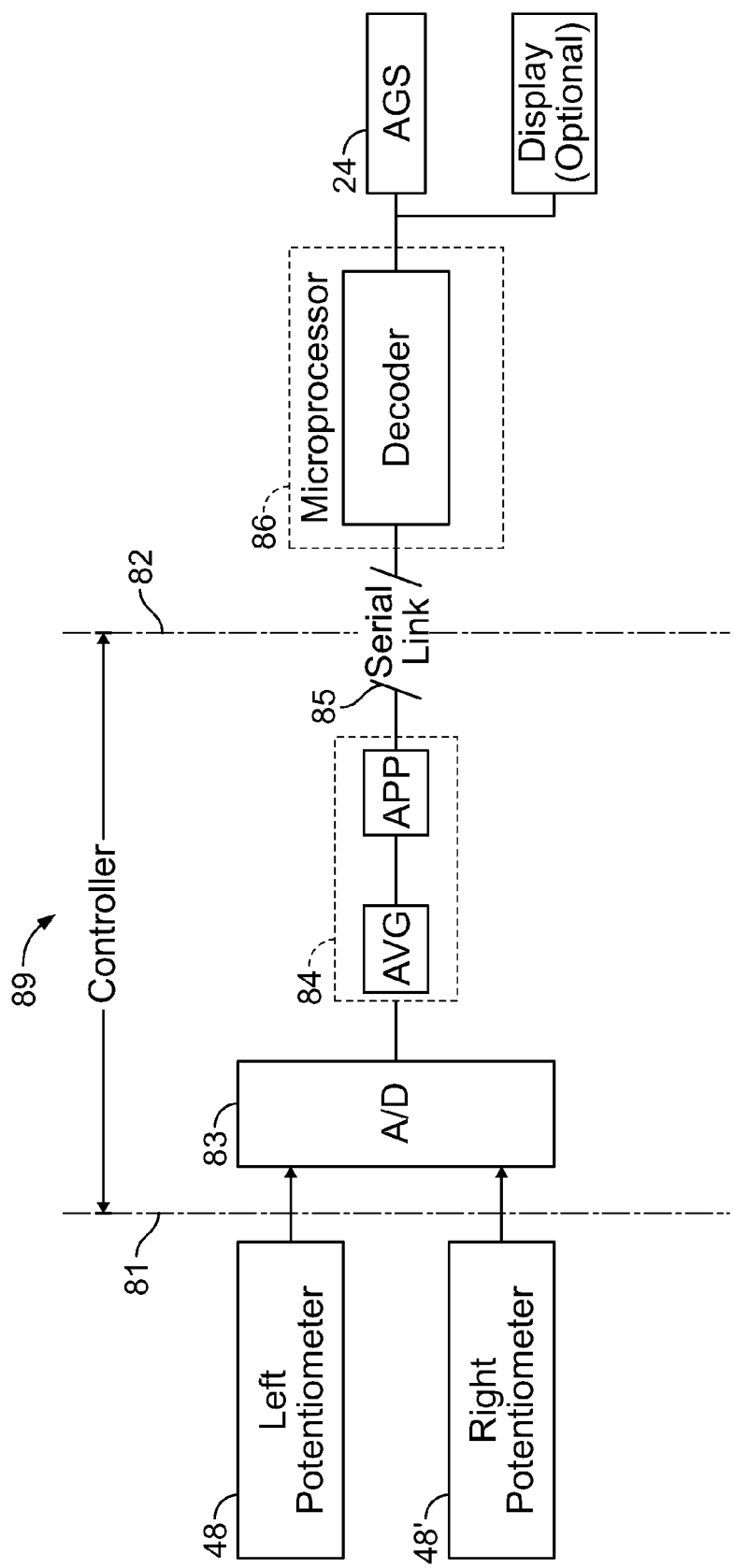
FIG. 5 shows an exemplary signal processing network for bale sensor signals and electrical system diagram.

In one embodiment, analog signals provided by potentiometers 48, 48' mounted on the opposing sidewalls are fed to a signal processing network 77 (FIG. 5) and converted to digital values or signals that are processed to provide comparative signals. Signals may optionally be displayed to an operator by a display unit 78. The digital values are used to adjust oscillatory path 30 as computed by automatic guidance system 24. If one or more sensors 45 indicate an imbalance or asymmetric bale shape, automatic guidance system 24 may adjust the interval length L or the amplitude h of oscillatory path 30 based on the feedback provided by the comparative signals. Once the sensors respective output signals cancel one another, or become balanced again, automatic guidance system 24 may return to steering powered vehicle 11 along the originally computed oscillatory path 30, i.e., applying the original parameters for frequency and amplitude h for oscillatory path 30. In another embodiment, automatic guidance system 24 may substitute the adjusted oscillatory path 30' in place of the original oscillatory path 30.

According to the disclosure, automatic guidance system 24 integrates bale shape information from bale shape sensors 45 to adjust amplitude h and/or interval L of oscillatory path 30, and transmits a corresponding steering command to a steering system of powered vehicle 11 to actuate steerable wheels of powered vehicle 11 along a desired path for evenly distributing crop material in rotary baler 10.

Now referring to FIG. 6, one embodiment of the method is disclosed. By reference to map 26, a baler swath path 14 may be implemented. At step 90 an automatic guidance system 24 is verified as operational, and at block 91 GPS coordinates information is received by automatic guidance system 24. Next, system 24 proceeds to step 92 and obtains map data defining A-B lines 12. At step 93, system 24 determines an oscillatory path 30 based on A-B lines 12. Based on GPS information, A-B lines 12 and oscillatory paths 30, a steering command is determined by automatic guidance system 24 at step 94. At step 95, the steering command is executed by the steering system of vehicle 11, to cause vehicle 11 to follow a path in the field that approximately corresponds to or substantially coincides with oscillatory path 30. At step 96, as vehicle 11 traverses field 22, automatic guidance system 24 monitors information from bale sensors 45 and proceeds to decision step 97. If at step 97 bale sensors 45 indicate an imbalance of crop material 16 that forms the bale in bale chamber 34, automatic guidance system 24 proceeds to step 98 where automatic guidance system 24 determines an adjustment to oscillatory path 30, i.e., interval L and/or amplitude h. From step 98, automatic guidance system 24 returns to step 94 and resumes steering commands according to the recomputed oscillatory path. If at step 98 there is no imbalance of crop material 16 indicated by bale chamber sensors 45, then automatic guidance system 24 proceeds to step 99, and resumes original oscillatory path 30. Automatic guidance system 24 then returns to step 91.

Figure 7:
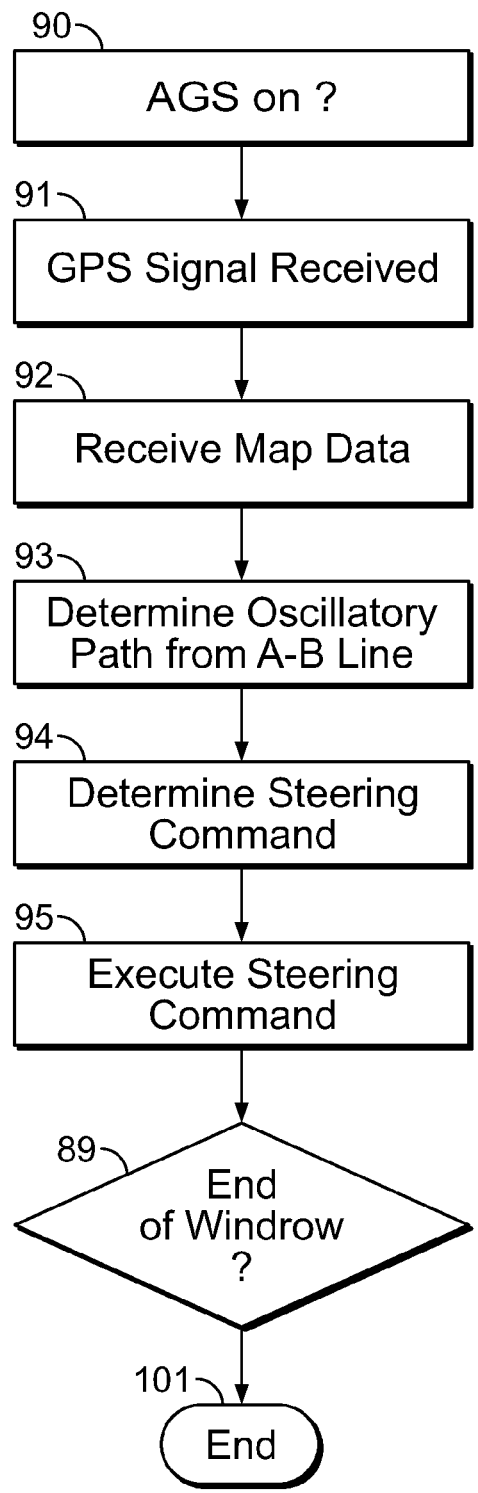
FIG. 7 shows a flow diagram for an embodiment of a method associated with the signal processing method.

In another embodiment, automatic guidance system 24 may implement an open loop steering configuration, i.e., without sensor feedback from bale chamber sensors 45. Referring to FIG. 7, at step 90 an automatic guidance system 24 is verified as operational, and at block 91 GPS information is received by automatic guidance system 24. Next, system 24 proceeds to step 92 and obtains map data defining A-B lines 12. At step 93, system 24 determines an oscillatory path 30 based on A-B line 12. Based on GPS information, A-B line 12 and oscillatory path 30, a steering command is determined by automatic guidance system 24 at step 94. At step 95, the steering command is executed by the steering system of vehicle 11 and proceeds to decision step 89. If at step 89, vehicle 11 has traversed the length of windrow 18, then automatic guidance system 24 is ended at step 101.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for automatically guiding a powered vehicle towing an agricultural implement for producing an even distribution of a crop material in a bale, the system comprising:
   a powered vehicle having, a global positioning system and an automatic guidance system;
   the powered vehicle comprising a global positioning system (GPS) sensor and an automatic guidance system, the GPS sensor configured to receive information representative of a geographic location of the powered vehicle; and
   the automatic guidance system comprising a map stored in a data memory;
   wherein the automatic guidance system is configured to:
      receive a location information representative of a position of the powered vehicle in the field;
      retrieve map data defining a first path representing a swath;
      determine a second path that oscillates about the first path using an algorithm taking into account a projected width of a swath and a width of a chamber of a baler to determine an amplitude of the second path and determining the amplitude from a function such that each side of the chamber traverses the swath in an interval of the oscillation, the automatic guidance system generating a set of points on alternating sides of the first path, the points when connected form the second path such that multiple data points are located on each side of the first path;
      generate a steering command based on the second path; and
   execute the steering command by a steering system of the powered vehicle to steer the powered vehicle along a path that corresponds to the second path.

2. The system of claim 1, further comprising:
the automatic guidance system further configured to:
monitor a bale shape information by the auto guidance system from a plurality of bale sensors disposed in the agricultural implement, each of the bale sensors configured to generate an indicating signal representing the distribution of the crop material in the bale chamber of the agricultural implement; and
adjust the second path in response to a plurality of the indicating signals indicating an imbalance of the crop material in the bale chamber.

3. The system of claim 2, further comprising:
a rotary baler comprising a plurality of bale chambers, ones of the plurality of bale sensors associated with each bale chamber; the rotary baler being towed by the powered vehicle along an approximate centerline in which the crop material has been arranged into a windrow.

4. The system of claim 3, further comprising:
a plurality of potentiometers, an analog-to-digital converter circuit, a first microprocessor associated with the controller, a serial link interconnecting the controller and the automatic guidance system; and a second microprocessor associated with the automatic guidance system;
the potentiometers connected to produce analog signals into the analog-to-digital converter circuit; the analog-to-digital converter circuit configured to produce digital signals representative of the analog signals; the microprocessor programmed to process the digital signals and produce digital data representing averaged levels of comparative degrees of compaction of the crop material; the serial link configured to transmit the digital data from the controller to the second microprocessor; the second microprocessor programmed to decode the digital data and transmit signals to the automatic guidance system.

* * * * *